(12) United States Patent
Katz et al.

(10) Patent No.: US 11,150,369 B2
(45) Date of Patent: Oct. 19, 2021

(54) THREE-DIMENSIONAL FRACTURE RADIUS MODEL

(71) Applicant: Baker Hughes, LLC, Houston, TX (US)

(72) Inventors: David Katz, Spring, TX (US); Sergey Stolyarov, Tomball, TX (US); Eduardo Adrian Cazeneuve, Spring, TX (US); Karim Sabaa, The Woodlands, TX (US); Gennady Koscheev, Spring, TX (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 36 days.

(21) Appl. No.: 16/693,497

(22) Filed: Nov. 25, 2019

(65) Prior Publication Data

US 2020/0166665 A1     May 28, 2020

Related U.S. Application Data

(60) Provisional application No. 62/771,969, filed on Nov. 27, 2018.

(51) Int. Cl.
*G01V 1/30*     (2006.01)

(52) U.S. Cl.
CPC .......... *G01V 1/301* (2013.01); *G01V 2210/10* (2013.01); *G01V 2210/646* (2013.01); *G01V 2210/663* (2013.01)

(58) Field of Classification Search
None
See application file for complete search history.

(56) References Cited

U.S. PATENT DOCUMENTS

| 2015/0013974 A1* | 1/2015 | Mekic | ........... E21B 43/26 166/254.1 |
| 2015/0109886 A1* | 4/2015 | Mekic | ........... G01V 1/44 367/25 |

(Continued)

OTHER PUBLICATIONS

Market et al., "Acoustic Fracture Characterisation—Intelligent Interpretation" SPWLA 58th Annual Logging Symposium, Jun. 17-21, 2017 (Year: 2017).*

(Continued)

*Primary Examiner* — John C Kuan
(74) *Attorney, Agent, or Firm* — Mintz Levin Cohn Ferris Glovsky and Popeo, P.C.

(57) ABSTRACT

Systems, methods, and computer-readable medium for generating a three-dimensional fracture network model are provided. The method can include receiving reflected acoustic signal measurements acquired in response to emission of acoustic waves by one or more sensors disposed in a wellbore formed within a target region. Each reflected acoustic signal measurement represents a strength of a reflected acoustic wave as a function of time measured in at least one predetermined direction oriented with respect to an axis of the wellbore. A fracture extension estimate is generated for each of the reflected acoustic signal measurements. A three-dimensional fracture network model is generated corresponding to the fracture extension estimates generated for each of the plurality of reflected acoustic measurements. The generated fracture network model is output for display or use in modeling environments.

20 Claims, 14 Drawing Sheets

(56) References Cited

U.S. PATENT DOCUMENTS

2016/0230515 A1* 8/2016 Hunter ................. E21B 28/00
2016/0363684 A1* 12/2016 Patterson ............. G01V 1/284
2018/0291734 A1* 10/2018 Ritzmann ............ E21B 49/087

OTHER PUBLICATIONS

Cazeneuve et al., "Beyond Thewellbore Hydraulic Fracture Diagnostic Using Deep Shear Wave Imaging" SPWLA 59th Annual Logging Symposium, Jun. 2-6, 2018 (Year: 2018).*

Sadigova A. et al., "Where's My Fracture Gone?—Imaging a Hydraulic Fracture Away From a Cased Borehole Before and After Stimulation" SPWLA 57th Annual Logging Symposium, Jun. 25-29, 2016 (Year: 2016).*

* cited by examiner

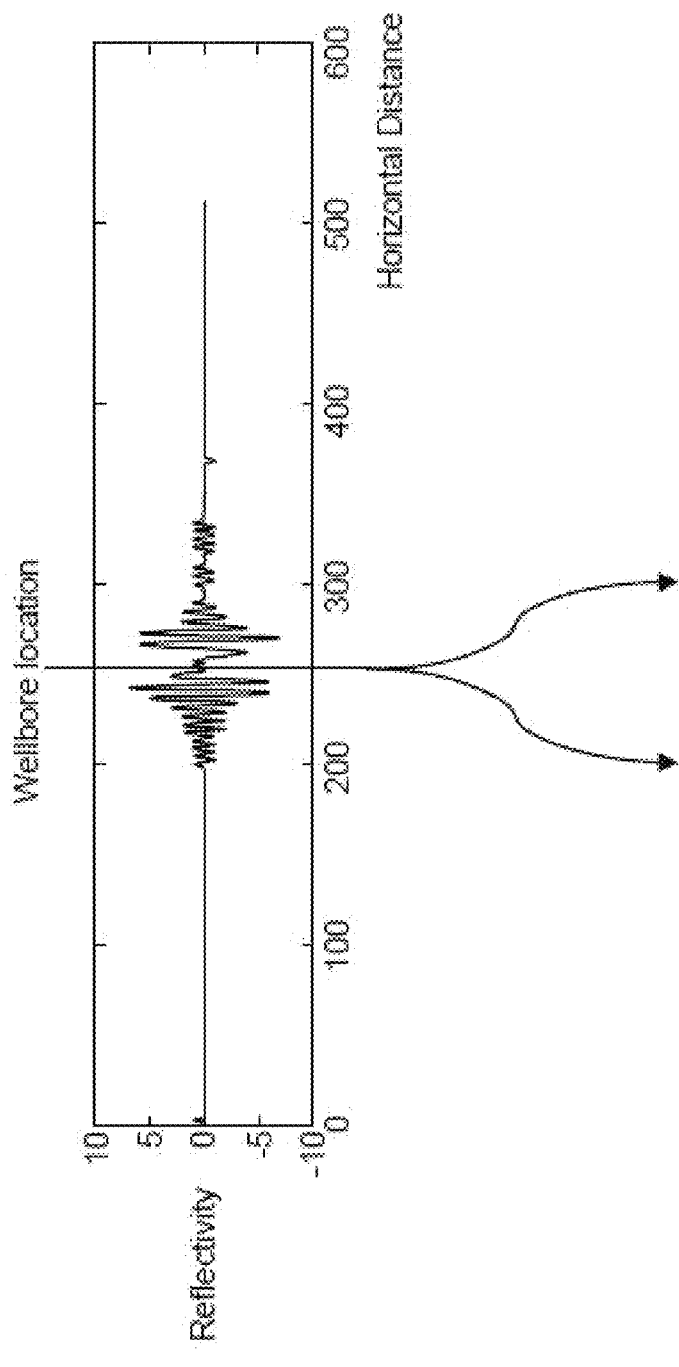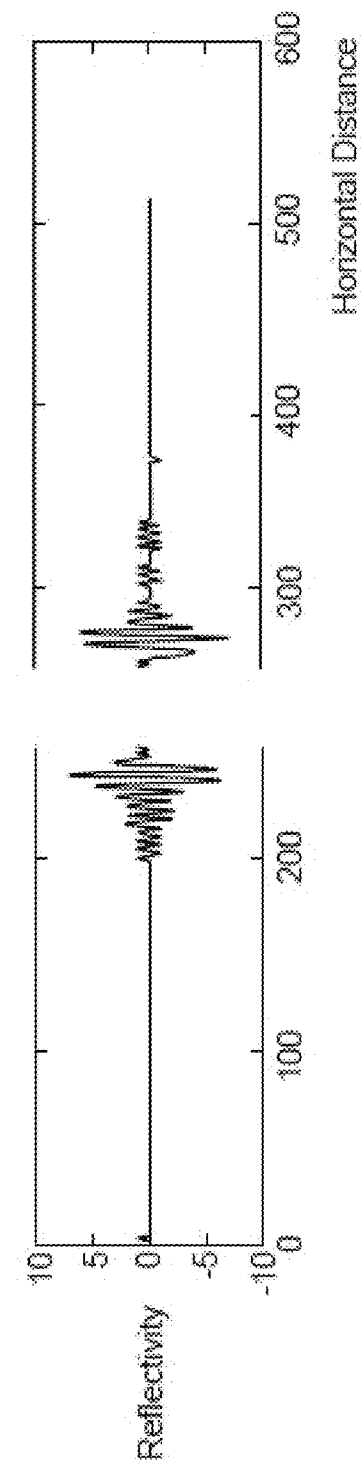

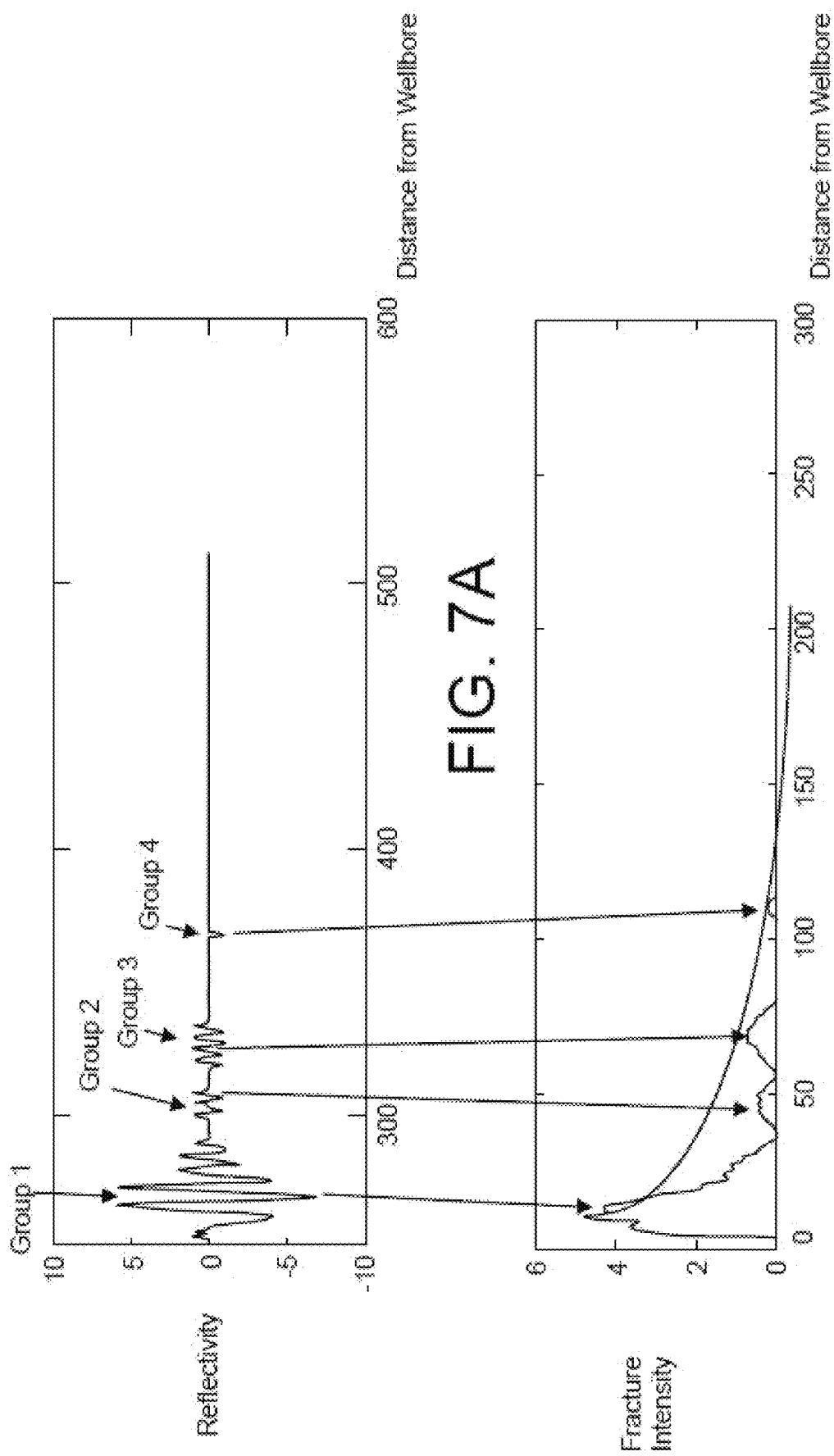

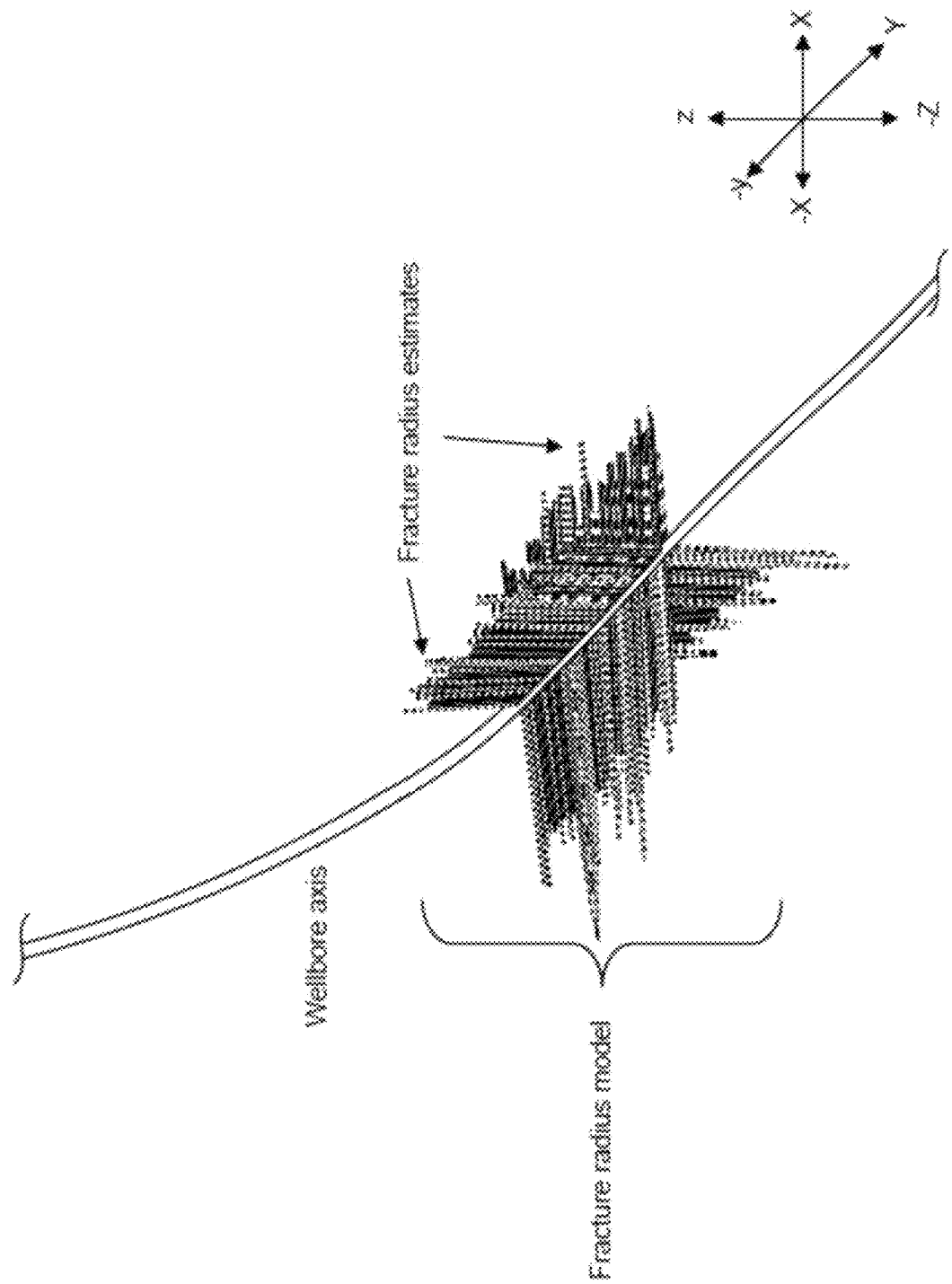

THREE-DIMENSIONAL FRACTURE RADIUS MODEL

CROSS REFERENCE TO RELATED APPLICATIONS

This application claims the benefit of and priority to U.S. Provisional Patent Application Ser. No. 62/771,969, filed on Nov. 27, 2018 and entitled "THREE-DIMENSIONAL FRACTURE RADIUS MODEL," the entirety of which is incorporated by reference.

BACKGROUND

Fractures or fracture networks enhance matrix permeability and producibility and maybe targeted. These faults or fracture networks may also present a geohazard, making evaluation and production operations in those areas less efficient or potentially undesirable. Thus, accurately identifying the presence, location, and extent of such fault and fractures networks can allow hydrocarbon evaluation and production operators to target locations which may include a high concentration of fractures or fracture networks. In this way, operators can deploy evaluation and production resources more efficiently based on a greater understanding of the characteristics of hydrocarbon sources.

Acoustic (sound) energy in the form of waves that have an amplitude (intensity) which varies in time at a frequency. In ultrasonic testing, an ultrasonic probe can generate one or more ultrasonic waves and these waves can be directed towards a target in a series of pulses. As the acoustic waves contact and penetrate the target, they can reflect from features such as outer surfaces and interior defects (e.g., fractures, cracks, faults, and/or porosity, etc.). The acoustic probe can acquire the same measurements, such as acoustic amplitude/impedance as a function of time, that characterize these reflected acoustic waves. Subsequently, acoustic measurements can be analyzed to determine target characteristics.

Accordingly, acoustic waves and the acquired acoustic measurements may be used to determine and model earth formations that may include target regions suitable for hydrocarbon exploration and production. Energy production operators may utilize the acquired acoustic measurements to identify hydrocarbon sources within the target regions. The acoustic measurement data may be processed to form models depicting the location, orientation, and formation characteristics of the hydrocarbon sources in the target regions. The models may be used in a variety of workflows associated with hydrocarbon production and exploration such as reservoir modeling and fracture modeling.

SUMMARY

Acoustic measurements estimating the prevalence and characteristics of hydrocarbon sources in target regions can be acquired by transmitting acoustic signals, from a sensor, such as a transducer, disposed in a borehole located within a target region to be evaluated. The acoustic signals transmitted from the transducer generate seismic body waves that radiate away from the borehole and are reflected back to the sensor by the hydrocarbon sources or various earth formations which may contain the hydrocarbon sources. The reflected body waves may be analyzed to estimate characteristics of the hydrocarbon sources. The reflected body waves may include compressional and/or waves that are reflected from the reflective boundaries of a hydrocarbon source formation. For example, deep wave imaging (DWI) or slowness processing may be performed to determine the presence of a hydrocarbon source formation and/or to evaluate the hydrocarbon content that may be present in a particular hydrocarbon source formation.

While acoustic data acquired using DWI can be used in detecting the presence of a feature in a hydrocarbon source formation, such as the presence of a fracture at a specific location in the target region, DWI data is of limited utility for detecting more detailed characteristics of a hydrocarbon source formation, such as the size, scale, and/or extent of a fracture network within a target region. Additionally, DWI data has limited use identifying the spatial characteristics of a fracture or a fracture network such as the dimensions of the fracture or the fracture network, the initiation or termination point of a discrete fracture, as well as the density of a multiple of fractures.

Hydrocarbon evaluation and production operators rely on models of data representing the location and characteristics of hydrocarbon sources in order to efficiently plan resources for exploration and production activities in a particular target region. Three-dimensional models can provide the greatest level of insight about the presence, characteristics, and location of hydrocarbon sources, but can be difficult and costly to produce. In general, three-dimensional models can be created from seismic data, however the three-dimensional seismic data models may have limited resolution to accurately depict the aforementioned characteristics of fractures or fracture networks. As a result, stochastic methods may be used to generate three-dimensional models, however, achieving sufficient resolution while maintaining certainty in the solution is a challenge.

Additionally, DWI data can be difficult to use in other workflows such as reservoir modeling and fracture modeling. These workflows can require a greater degree of data resolution than can be generated by DWI methods alone. For example, developing discrete fracture network (DFN) reservoir models from DWI data can require additional data processing techniques in order to generate an appropriate level of resolution and the necessary planar geometries of the DWI data for importation into other modeling paradigms or modeling tool workflows.

In general, systems, methods, and computer-readable mediums are provided for generating a three-dimensional fracture network model. The ability to generate the three-dimensional fracture network model from DWI image data can provide hydrocarbon evaluation and production operators with greater insight, compared to seismic imaging methods for example, about the presence, location, and characteristics of hydrocarbon energy sources in target regions associated with evaluation and/or production operations. Additionally, the three-dimensional fracture network model generated via the systems and methods disclosed herein can be more readily utilized in workflows or tools associated with reservoir modeling and fracture modeling.

In one embodiment, a method for generating a three-dimensional fracture network model is provided. The method can include receiving, by a processor, a plurality of reflected acoustic signal measurements acquired in response to emission of acoustic waves by one or more sensors disposed in a wellbore formed within a target region. Each of the reflected acoustic signal measurements represents a strength of reflected acoustic waves as a function of time measured in at least one predetermined direction oriented with respect to an axis of the wellbore. The method can also include generating, by the processor, a fracture extension estimate. The fracture extension estimate represents a length of fracture within an area extending from the wellbore within the target region in at least one predetermined direction. The method of generating the fracture extension estimate can further include determining a fracture intensity threshold for each of the plurality of reflected acoustic signal measurements. The method of generating the fracture extension estimate can further include determining, based on the determined fracture intensity threshold, the fracture extension estimate for each of the plurality of reflected acoustic signal measurements. The method can further include generating a three-dimensional fracture network model corresponding to the fracture extension estimates generated for each of the plurality of reflected acoustic measurements. The method can also include outputting the generated fracture network model.

In another embodiment, the method can include generating the three-dimensional fracture network model by combining the fracture extension estimates generated for each of the plurality of reflected acoustic signal measurements.

In another embodiment, the method can further include combining the generated fracture extension estimates for each of the plurality of reflected acoustic signal measurements based on reflected acoustic signal measurements acquired in at least two different directions approximately perpendicular to the axis and/or along the axis of the wellbore at a plurality locations oriented along the wellbore axis.

In another embodiment, the method can include generating a three-dimensional fracture network model representing an extent of fracture extending from the wellbore at the plurality of locations oriented along the wellbore axis.

In another embodiment, the method can include using the generated three-dimensional fracture network model to update a reservoir model in a modeling and simulation environment. In another embodiment, the method can include using the generated three-dimensional fracture network model to design a reservoir model in a modeling and simulation environment. In another embodiment, the method can include using the generated three-dimensional fracture network model to forecast results associated with stimulation of a reservoir being modeled in a modeling and simulation environment. In another embodiment, the method can include using the generated three-dimensional fracture network model to analyze one or more efficiency measurements associated with stimulation of a reservoir model in a modeling and simulation environment.

In another embodiment, the one or more sensors can include deep wave imagining sensors.

In another embodiment, the fracture intensity threshold can be determined based on one or more of a wavelength of the acoustic wave emitted by the one or more sensors, and/or a resolution of the reflected acoustic waves received by the one or more sensors.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other features will be more readily understood from the following detailed description taken in conjunction with the accompanying drawings, in which:

FIGS. 6A and 6B are plots illustrating a two-dimensional reflected acoustic signal measurement processed according to the methods described herein;

FIGS. 7A and 7B are plots illustrating a two-dimensional reflected acoustic signal measurement processed to determine a fracture intensity threshold according to the methods described herein;

FIG. 13 is a plot illustrating a three-dimensional fracture network model generated according to the methods described herein;

Figure 1A:
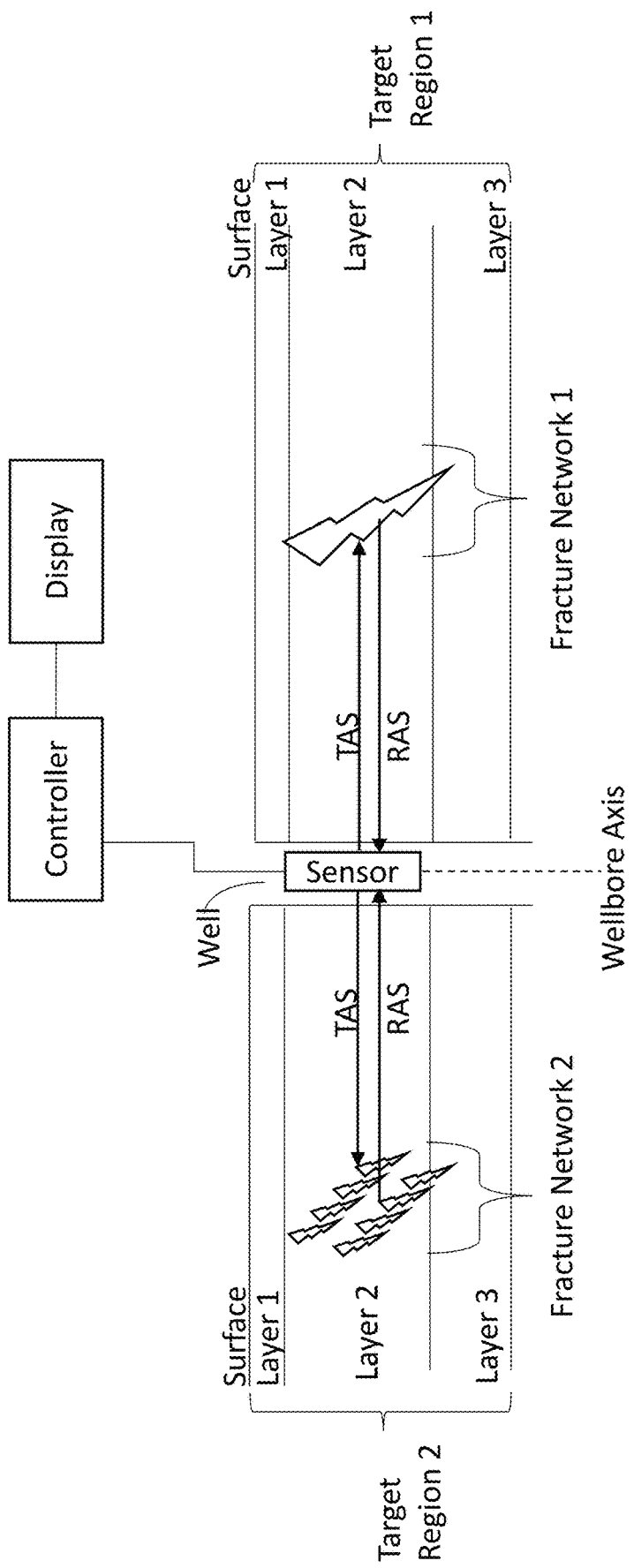
FIG. 1A is a diagram illustrating one exemplary embodiment of an operating environment including a system for generating a three-dimensional fracture network model associated with a vertically oriented wellbore axis according to the methods described herein.

It is noted that the drawings are not necessarily to scale. The drawings are intended to depict only typical aspects of the subject matter disclosed herein, and therefore should not be considered as limiting the scope of the disclosure.

DETAILED DESCRIPTION

Acoustic sensing and imaging systems can be utilized to transmit acoustic signals and acquire the acoustic signals that are reflected from hydrocarbon sources in earth formations. The reflected acoustic signals can be measured to identify the presence of the hydrocarbon sources and characteristics of the earth formations in which the hydrocarbon sources can exist. As an example, the reflected acoustic signals can be reflected from surfaces or boundary interfaces of the materials in earth formations, such as outer surfaces and interior characteristics of the earth formations such as cracks, fractures or networks of fractures. Different earth formation features, such as geometric boundaries (earth formation layers) and regions having destabilizing fractures within one or more layers of the earth formations (fractures or fracture networks), can reflect acoustic signals in different ways and thus the strength or intensity of the reflected acoustic signals can vary. Earth formation features can also be located at different distances from an acoustic sensor and the time a reflected acoustic signal reaches the sensor can vary. Thus, acoustic sensing systems have been developed to measure the presence of earth formation features, such as fractures or fracture networks, based on the reflected acoustic signals. However, such systems can be limited in their ability to analyze the strength, time behavior, and geometric orientation of reflected acoustic signals in order to develop accurate three-dimensional models of fractures or fracture networks that can be present in the earth formation features. Accordingly, improved systems and methods are provided for processing reflected acoustic signals, such as acoustic signals reflected during DWI. The improved systems and methods can enable generation of more accurate three-dimensional models of a fracture network in a target region of hydrocarbon sources by providing additional detail as to the spatial extent and characterization of a fracture or a fracture network that may be present in a target region of hydrocarbon sources. The three-dimensional models can be used for importation into other modeling environments or workflows, such as reservoir modeling and discrete fracture network modeling. In this way, hydrocarbon evaluation and production operators can plan and conduct operations more efficiently based on the three-dimensional models.

Embodiments of sensing systems and corresponding methods for generating a three-dimensional fracture network model based on deep wave imaging (DWI) data are discussed herein. However, embodiments of the disclosure can be employed to generate a three-dimensional fracture network model based on data acquired via other imaging techniques without limit.

FIG. 1A illustrates an exemplary embodiment of an operating environment including a system for generating a three-dimensional fracture network model associated with a vertically oriented wellbore axis according to the methods described herein. The system can include at least one Sensor, a Controller, and a Display.

As shown, a Well is oriented vertically through a surface opening and through a plurality of earth formation layers, such as Layers 1, 2, and 3. The placement of the Well is oriented with respect to one or more target regions being evaluated or operated for hydrocarbon production, such as Target Region 1 and Target Region 2. Each target region includes a fracture network extending through one or more layers of the target region. Fracture Network 1 includes a single large fracture within Target Region 1 and Fracture Network 2 includes multiple smaller fractures within Target Region 2. A Sensor, such as an acoustic sensor, can be disposed in the vertical Well. The Sensor is oriented approximately parallel to the vertical Wellbore Axis. The Sensor is capable of generating transmitted acoustic signals (TAS) and receiving reflected acoustic signal (RAS) measurements. In some embodiments, the Sensor is configured to perform deep wave imaging (DWI).

In use, the Sensor emits TAS through the wellbore and any wellbore casing which may be present in the well (not shown) into the target regions. In some embodiments, the Sensor is configured to generate TAS and receive RAS measurements in one or more directions that are substantially perpendicular to the Wellbore Axis. In other embodiments, the Sensor is configured to generate TAS and receive RAS measurements at one or more angles relative to the Wellbore Axis. When a TAS reaches a fracture or a fracture network, RAS measurements are reflected back to the Sensor where they are received. The Sensor is further provided in electrical communication with the Controller. The Controller can be configured to provide executable instructions to the Sensor and to perform processing of the RAS measurements obtained by the Sensor according to the methods described herein for generating a three-dimensional fracture radius model. As further shown in FIG. 1A, the Controller is coupled to a Display to output the processed RAS measurements. In some embodiments, the Display may be located remotely from the Controller. In some embodiments, the Controller can also include one or more data storage components.

In some embodiments (not shown), the system may include a plurality of Controllers. For example, a first Controller may be located in proximity to the Sensor and a second Controller located remotely from the Sensor. In this embodiment, the first Controller may be configured to forward the RAS measurements to the second Controller. The second Controller may be further configure to process the forwarded RAS measurements.

Figure 1B:
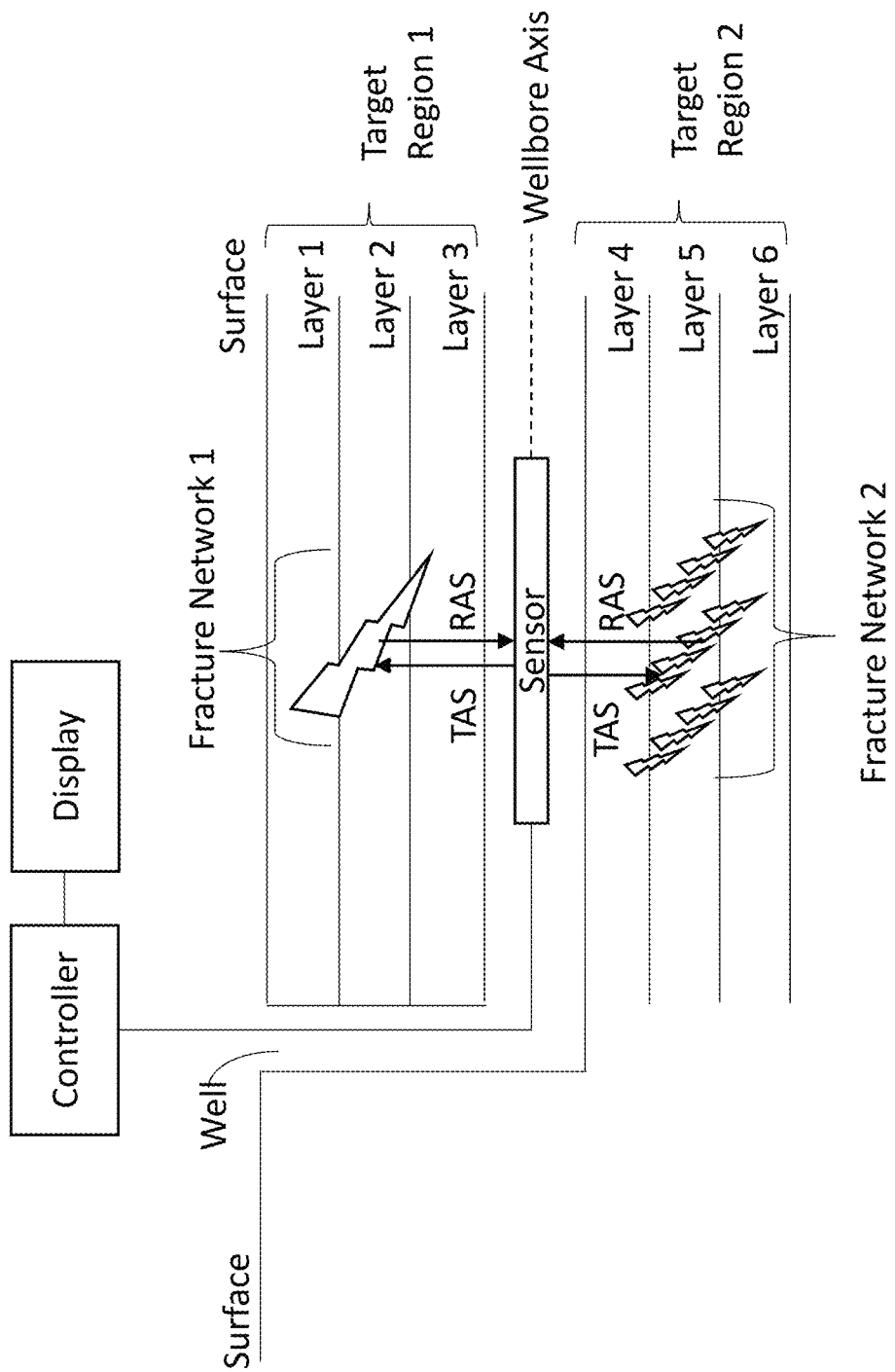
FIG. 1B is a diagram illustrating one exemplary embodiment of an operating environment including a system for generating a three-dimensional fracture network model associated with a horizontally oriented wellbore axis according to the methods described herein.

FIG. 1B illustrates an exemplary embodiment of an operating environment including a system for generating a three-dimensional fracture radius model associated with a horizontally oriented wellbore axis according to the methods described herein. A Well is introduced vertically through a surface opening and through Layers 1, 2, and 3 of Target Region 1. The Wellbore Axis is then adjusted along a horizontal path between Layer 3 and Layer 4. As described in relation to FIG. 1A, a Sensor is disposed in the Well and configured to perform DWI. In some embodiments, the Sensor is configured to generate TAS and receive RAS measurements in one or more directions that are substantially perpendicular to the Wellbore Axis. In other embodiments, the Sensor is configured to generate TAS and receive RAS measurements at one or more angles relative to the Wellbore Axis. The Sensor generates TAS and obtains RAS measurements from Fracture Network 1 and Fracture Network 2. For example, the Sensor may obtain RAS measurements reflected from Fracture Network 1, e.g., a large single fracture, present in Layers 1, 2, and 3 of Target Region 1. Additionally, the Sensor may obtain RAS measurements reflected from Fracture Network 2, e.g., a series of multiple smaller fractures, present in Layers 4, 5, and 6 of Target Region 2. As described in relation to FIG. 1A, the Sensor is coupled to a Controller providing executable instructions to the Sensor and performing processing of the RAS measurements obtained by the Sensor according to the methods described herein for generating a three-dimensional fracture radius model. The Controller is further coupled to a Display to output the processed RAS measurements.

Figure 2:
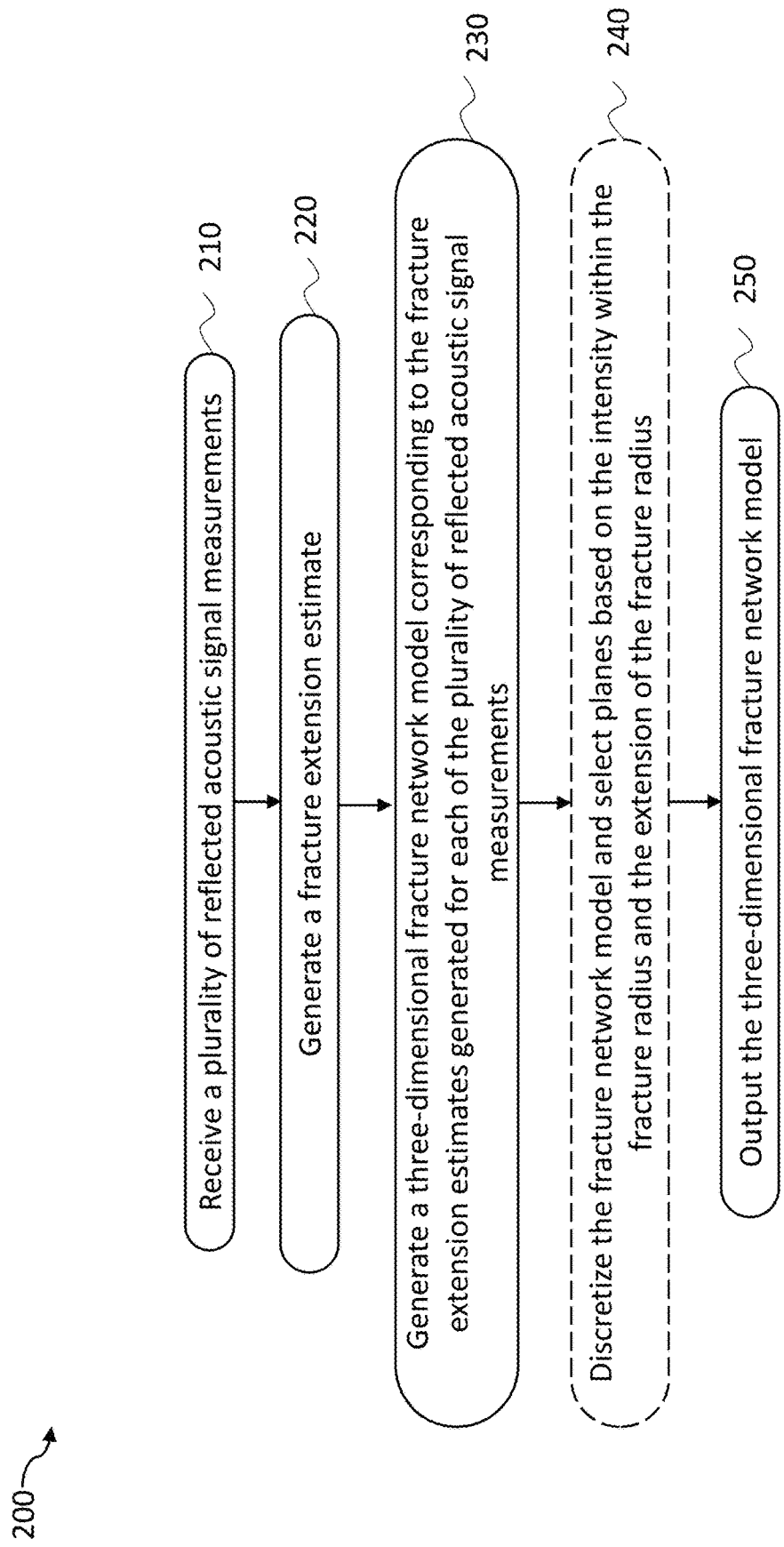
FIG. 2 is a flow diagram illustrating an exemplary embodiment of a method for generating a three-dimensional fracture network model.

FIG. 2 is a flow diagram illustrating an exemplary embodiment of a method 200 for generating a three-dimensional fracture network model (e.g., a three-dimensional model of Fracture Network 1 or 2 shown in FIG. 1A or 1B). The method 200 may be performed by the Controller shown and described in relation to FIG. 1A or 1B. As shown, the method 200 may include operations 210-250. To provide additional context, the operations of method 200 are described with reference to FIGS. 4-13.

Figure 4:
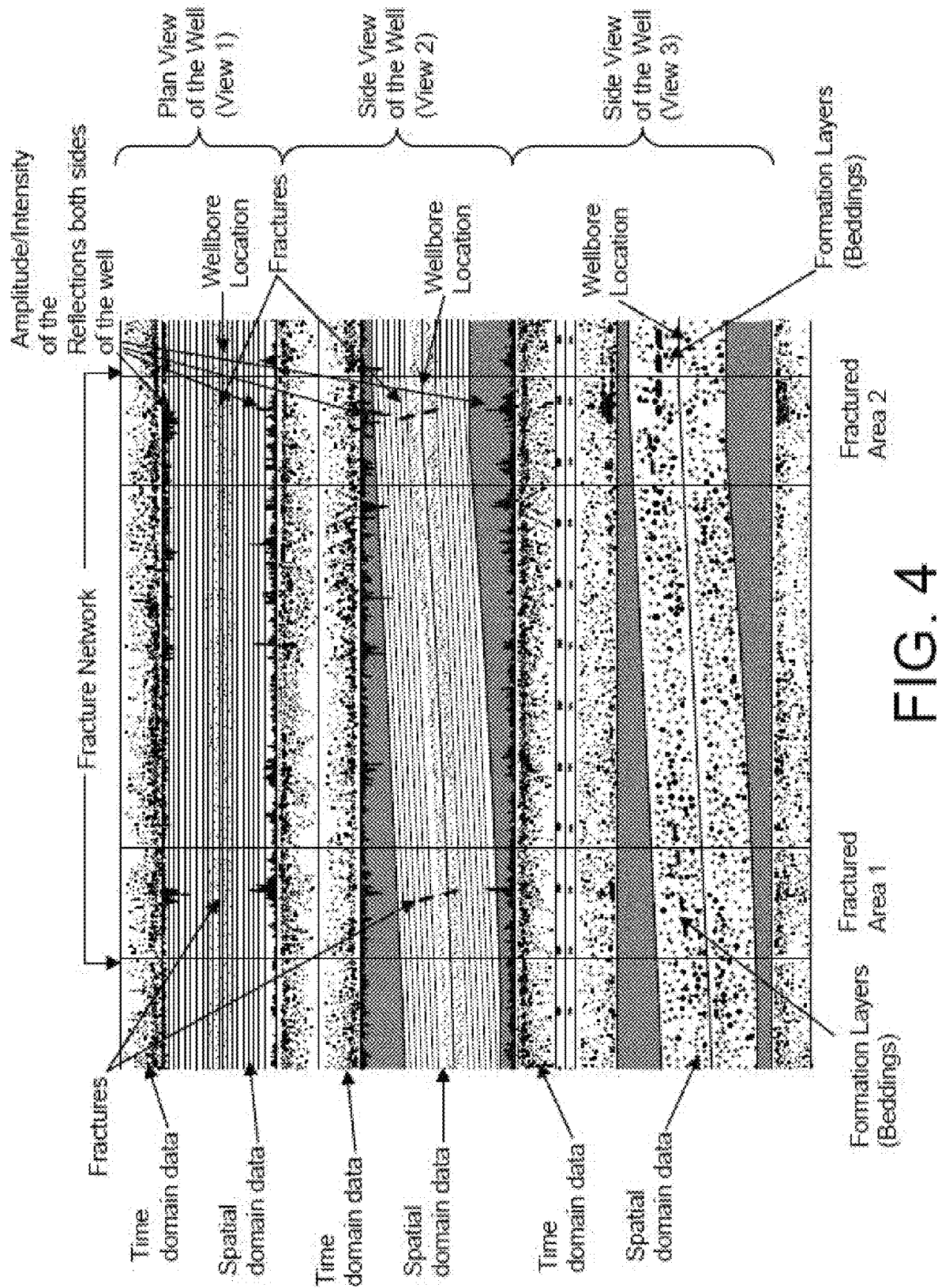
FIG. 4 is a plot illustrating a two-dimensional fracture network model generated from DWI data.

In operation 210, and as illustrated in FIG. 4, a plurality of reflected acoustic signal (RAS) measurements are received by the Controller. For example, the RAS measurements received by the Sensor can be reflected from a fracture network in target region for further processing. In certain embodiments, the RAS measurements received the Controller may be obtained by the Sensor using deep wave imaging (DWI) as described in U.S. Pat. No. 9,885,795, which is incorporated herein by reference in its entirety.

FIG. 4 is a plot illustrating a two-dimensional fracture network model generated from DWI data. Each of Views 1-3 include time domain data and spatial domain data acquired using DWI. The time domain data has been rotated into the respective directions. The corresponding spatial domain data has been migrated from the time domain data. FIG. 4 illustrates the plurality of RAS measurements that may be generated using DWI methods to acoustically image a fracture network. The fracture network has been imaged as three corresponding layers, e.g., Views 1-3. As shown in FIG. 4, the fracture network includes two fracture areas, Fracture Area 1 and Fracture Area 2. DWI detects the presence of fractures in each of the two Fracture Areas, however data acquired using DWI does not present itself to be readily usable to describe the fracture networks in terms of the spatial extent, frequency of occurrence, and orientation of the fractures in the fracture network.

Due to the limited use of the received RAS measurements obtained using DWI, subsequent processing can be required to generate a three-dimensional fracture network model. The plurality RAS measurements may be formatted as one or more arrays. Each array may include data values associated with the amplitude of the RAS measurement received for a given geometric orientation at a specific location along the axis of the wellbore. The RAS measurements may be associated with a plurality of location increments along the axis of the wellbore. Non-limiting examples of a range of location increments may include 0.1'-0.3', 0.3'-0.5', 0.5'-0.7', 0.7'-1.0'. In some embodiments, the received RAS measurements may be plotted on an index basis if the increment is uniform. In some embodiments, the Controller may perform a data integrity check of the received RAS measurements prior to further processing.

Figure 5:
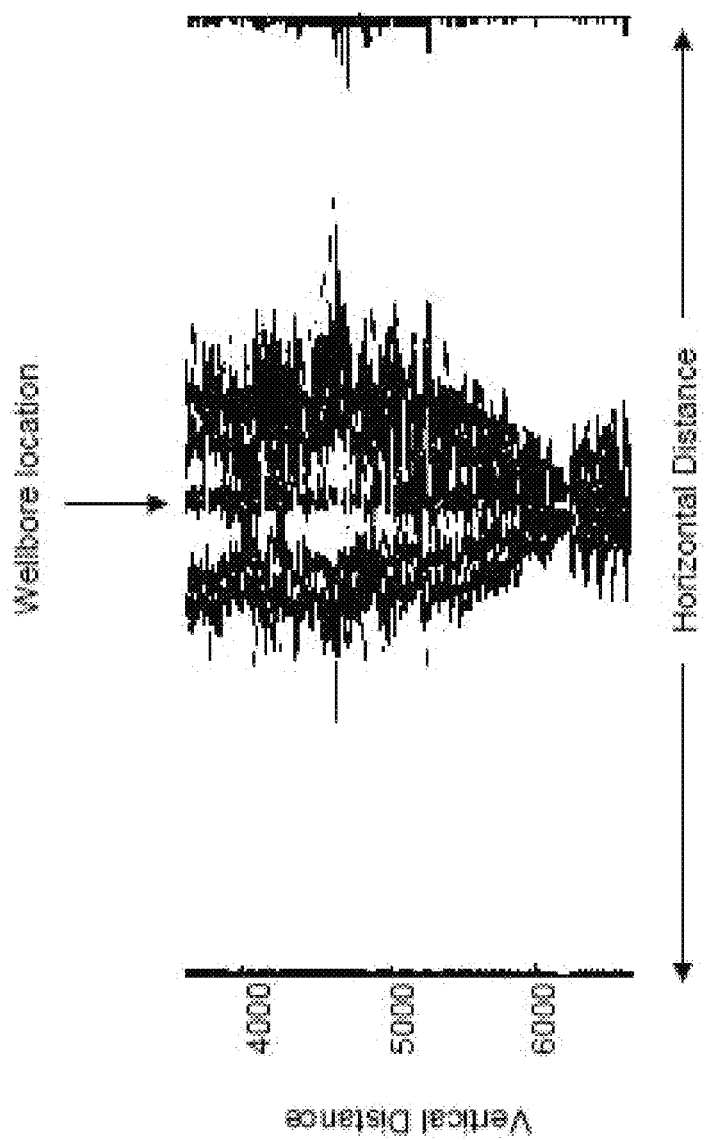
FIG. 5 is a plot illustrating a two-dimensional fracture network model associated with a vertically oriented wellbore generated from DWI data.

FIG. 5 is a plot illustrating a two-dimensional fracture network model generated from data acquired using DWI associated with a vertically oriented wellbore, such as that of FIG. 1A. The vertically oriented wellbore location can be seen in the middle of FIG. 5. The RAS measurements received from the Sensor disposed in the wellbore are plotted in relation to the vertical location along the wellbore axis at which the RAS measurements were received by the Sensor. The horizontal axis of each plotted RAS measurement indicates the strength or intensity of the RAS measurements as a function of the distance from the wellbore. A smoothing function has been applied and the absolute values of the RAS measurements are plotted as shown in FIG. 5.

FIGS. 6A and 6B are plots illustrating a RAS measurement acquired in opposite horizontal directions relative to a vertically oriented wellbore axis and processed according to the methods described herein. As shown in FIG. 6A, a plot of the strength or intensity of a RAS measurement received by a Sensor disposed in the wellbore may be created by the Controller. The plot shows the strength or intensity of a RAS measurement associated with a fracture or fracture network, or portions thereof, at a particular depth in the wellbore. The amplitude of the RAS measurement can be plotted as a measure of the reflectivity of the acoustic wave received by the Sensor. As further shown, the strength or intensity of the RAS measurement is shown as a function of the horizontal distance from the wellbore location in two directions (e.g., on either side of the wellbore location).

As shown in FIG. 6B, the Controller may be configured to split the plot of RAS measurements received in two directions shown in FIG. 6A into a plot of the RAS measurement in a single direction. For example, based on the location of the wellbore, the Controller may process the RAS measurement illustrated in FIG. 6A into two plots shown in FIG. 6B. Each plot may be associated with the RAS measurement in a single direction extending away from the wellbore into the target region being imaged (e.g., approximately horizontal). In this way, single direction vectors of RAS measurements may be further processed by the Controller and utilized to generate a three-dimensional fracture radius model according to the methods described herein.

In operation 220, the Controller processes the plurality of received RAS measurements to generate a fracture extension estimate for each of the RAS measurements. The fracture extension estimate represents a length of a fracture within an area extending from the wellbore within a target region in a predetermined direction. In certain embodiments, a fracture extension estimate can be understood to be a measurement of the distance of a particular fracture or fracture network from the location of the wellbore axis (e.g., a geometrically centered axis or axis of symmetry) to the location of the farthest detectable boundary of the fracture or fracture network.

Figure 3:
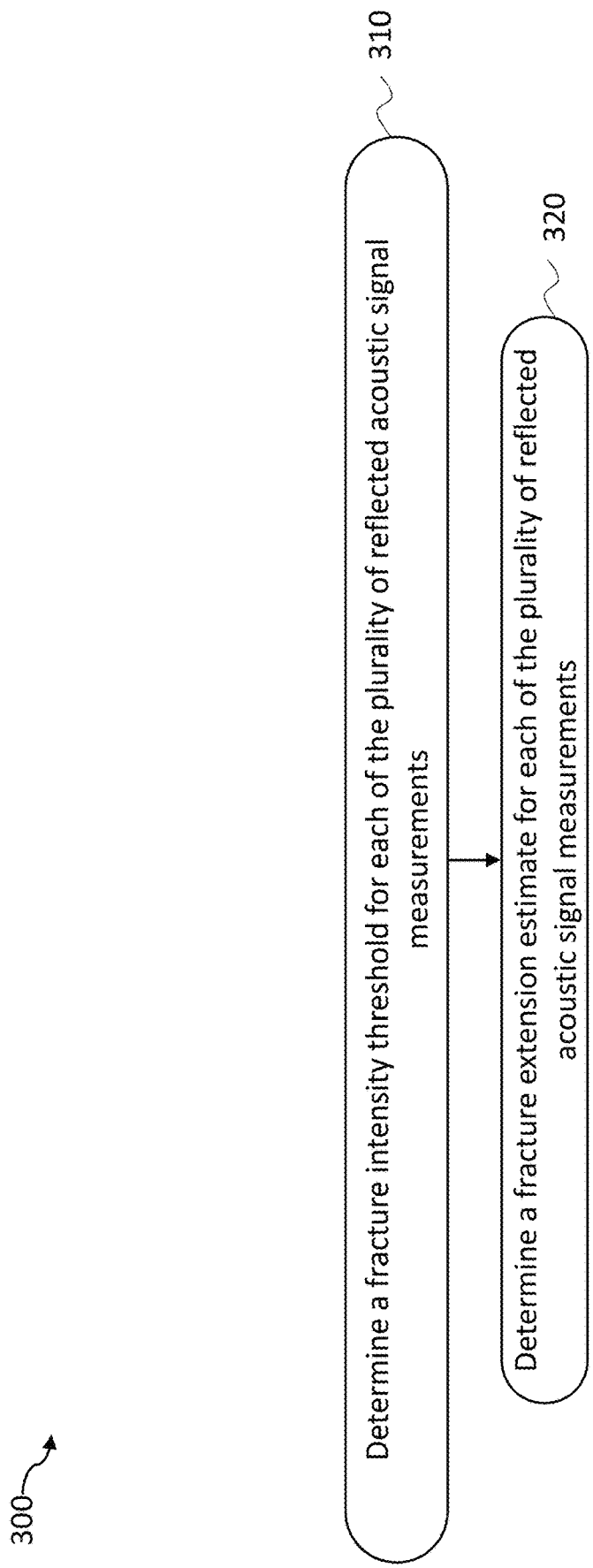
FIG. 3 is a flow diagram illustrating an exemplary embodiment of a method for generating a fracture extension estimate.

FIG. 3 is a flow diagram illustrating an exemplary embodiment of the method 300 for generating a fracture extension estimate. The method 300 may be performed by the Controller shown and described in relation to FIG. 1A or 1B. As shown, the method 300 may include operations 310-320, which will be described in conjunction with FIGS. 7A-10.

In operation 310, and as illustrated further in FIGS. 7A and 7B, the Controller determines a fracture intensity threshold for each of the plurality of RAS measurements. In some embodiments, the Controller may apply a curve fitting function to the RAS measurements and determine the absolute values that are associated with the highest amplitudes along the curve. The absolute values are characterized by their distance from the wellbore so that the fracture intensity can be determined in relation to the distance from the wellbore.

FIGS. 7A and 7B are plots illustrating a RAS measurement in a single direction that is processed to determine a fracture intensity threshold according to the methods described herein. As described previously in relation to FIG. 6B, the Controller may process a RAS measurement in two directions to generate a two-dimensional RAS measurement in a single direction shown in FIG. 7A. The Controller may further process the two-dimensional RAS measurement in a single direction to generate a fracture intensity measurement necessary to calculate a fracture intensity threshold and a fracture extension estimate for each RAS measurement. For example, as shown in FIG. 7B, and described in relation to the operations of method 300 shown in FIG. 3, the Controller may determine the strength of the reflected acoustic waves represented by each of the RAS measurements and further determine a fracture intensity measurement for each of the plurality of RAS measurements (e.g., operation 310). For example, as shown in FIG. 7A, each grouping of RAS measurement amplitudes (e.g., Groups 1-4) is correlated to the determined fracture intensity measurement plotted in FIG. 7B as a function of distance from the wellbore.

Figure 8:
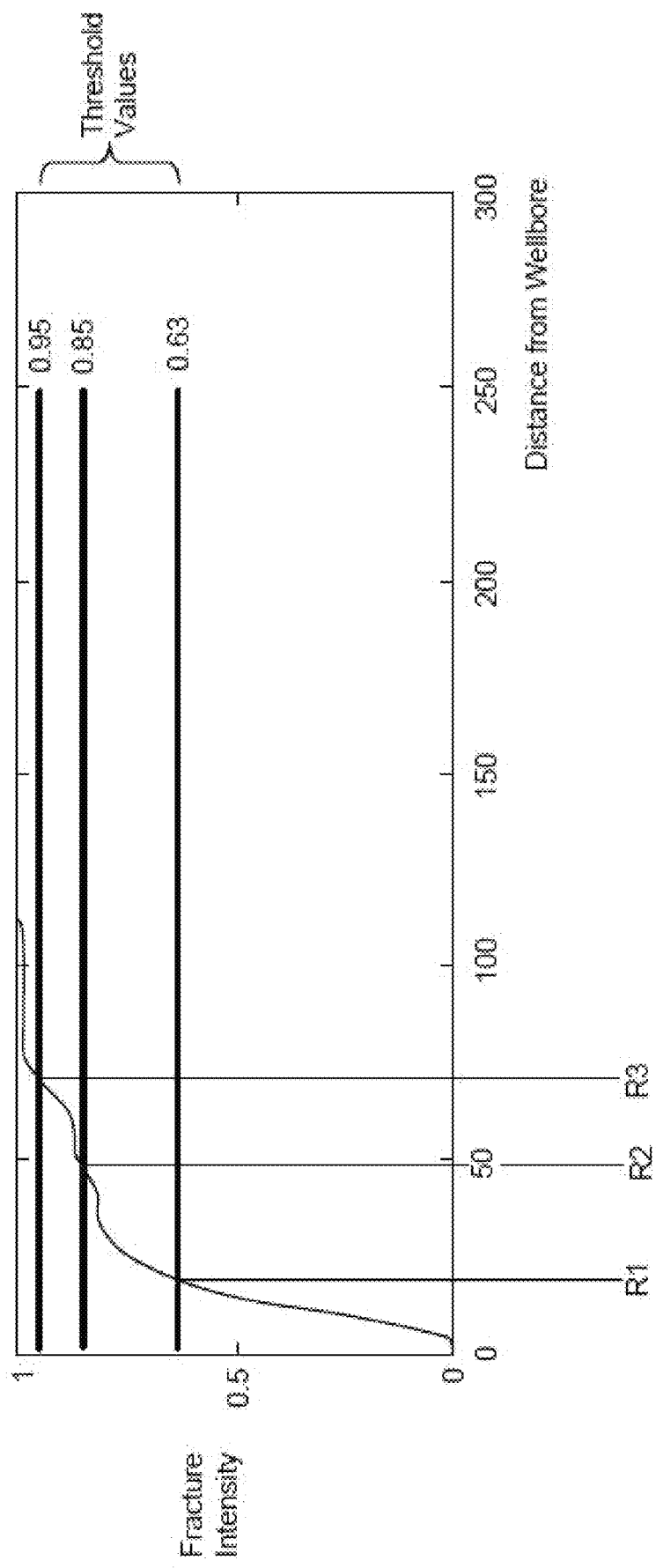
FIG. 8 is a plot illustrating application of predetermined threshold values to a cumulative fracture intensity for a reflected acoustic signal measurement and generating a fracture extension estimate.

In operation 310 and as illustrated in FIG. 8, the Controller determines a fracture intensity threshold for each of the plurality of RAS measurements. In some embodiments, the Controller may sum the fracture intensity measurement determined for each RAS measurement and determine a fracture intensity threshold for each RAS measurement as a function of the distance from the wellbore.

FIG. 8 is a plot illustrating application of predetermined threshold values to a fracture intensity measurement for a RAS measurement and generating a fracture extension estimate. The Controller may apply a predetermined threshold to each of the RAS measurements. In some embodiments, the Controller may apply a predetermined threshold value to reduce the signal to noise ratio exhibited by the RAS measurement. For example, as shown in FIG. 8, a plot of the fracture intensity is shown as a function of the distance from the wellbore. By way of example, three threshold values are shown (e.g., 0.63, 0.85, and 0.95). A fracture radius estimate may be generated by the Controller based on the predetermined threshold value. For example, based on applying a threshold value of 0.63, the Controller may generate a fracture extension estimate corresponding to the distance from the wellbore in which the fracture intensity curve intersects the predetermined threshold value, e.g., R1. Similarly, based on applying a threshold value of 0.95 the Controller may generate a different fracture extension estimate, e.g., R3. The application of a particular predetermined threshold value is directly correlated to the determination of the fracture extension estimate and thus, how the spatial extent of the fracture or fracture network is characterized. In some embodiments, the predetermined threshold value may be applied by the Controller based on manual input of predetermined threshold value received from an operator of the Controller. In other embodiments, the Controller may store a range of predetermined threshold values. In these embodiments, the Controller may be configured to apply specific predetermined threshold values based on variables such as target region characteristics, the wavelength of the RAS or TAS source, and/or the resolution of the original image acquired via DWI.

Based on determining the fracture intensity threshold, the Controller applies a predetermined threshold value to the fracture intensity measurements for each of the plurality of RAS measurements. In some embodiments, the predetermined threshold may be determined by empirical methods. The applied threshold is utilized to suppress noise in the cumulative fracture intensities for each RAS measurement. In some embodiments, the applied threshold value may be predetermined based on the acoustic wavelength of the TAS or the RAS. In some embodiments, the predetermined threshold may include threshold values in the range of 0.3-0.5, 0.5-0.7, or 0.7-1.0.

Figure 9:
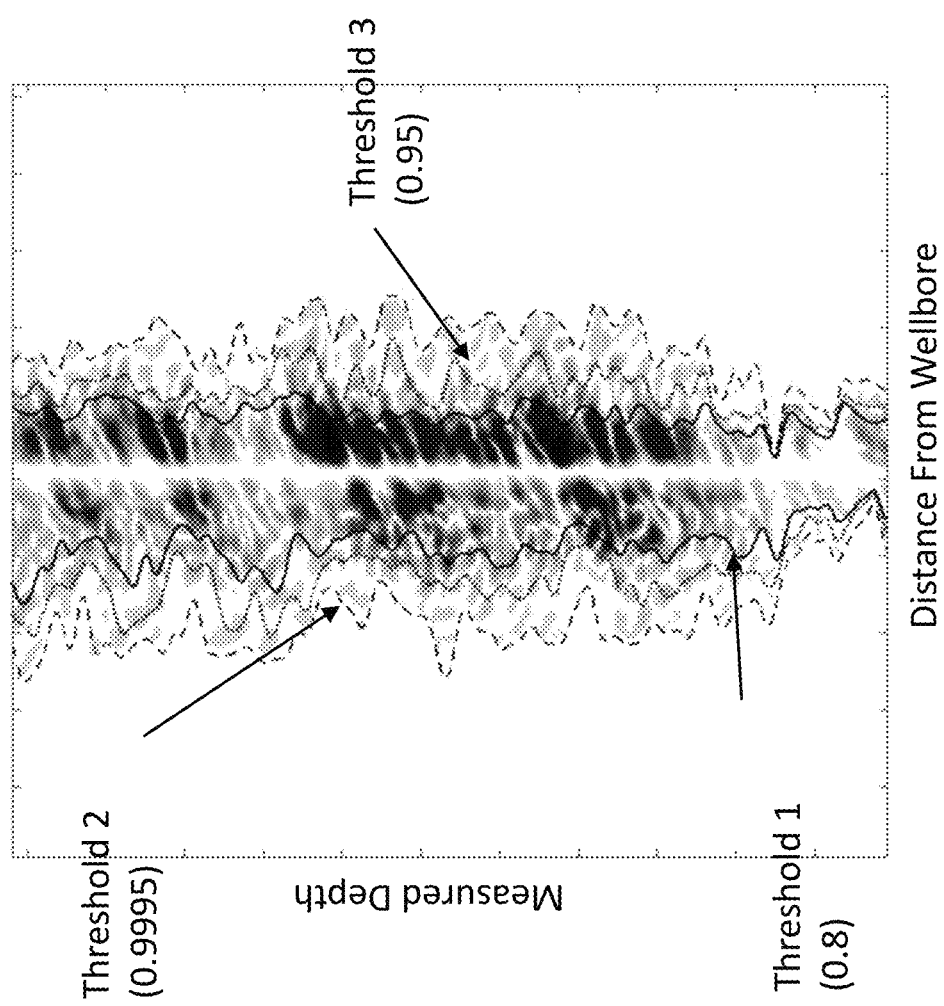
FIG. 9 is a plot illustrating threshold values applied to a plurality of fracture intensity measurements.

FIG. 9 is a plot illustrating three predetermined threshold values applied to fracture intensity measurements for a plurality of RAS measurements. As described above in relation to FIG. 8, the Controller may apply a predetermined threshold value to the fracture intensity measurements for each RAS. The predetermined threshold value which is applied may have different effects on the signal to noise ratio of the fracture intensity measurement for a given RAS measurement. For example, as shown in FIG. 9, Threshold 1 has a threshold value of 0.9 and has the effect of attenuating the signal to noise ratio observed in the plot of the fracture intensity measurements. As further shown in FIG. 9, Threshold 2 has a value of 0.9995 and has the effect of amplifying the signal to noise ratio observed in the plot of the cumulative fracture estimate. As further shown in FIG. 9, Threshold 3 has a value of 0.95 and may be predetermined as an appropriate threshold value to apply based on an acceptable signal to noise ratio exhibited in the fracture intensity measurements.

In operation 320, based on applying the predetermined threshold to the fracture intensity measurements each of the plurality of RAS measurements, the Controller may determine the fracture extension estimate associated with each RAS measurement. In this way, the Controller can create a shape approximation associated with each of the plurality of RAS measurements indicating the spatial extent of the fracture or fracture network in regards to the distance of the fracture or fracture network from the wellbore.

Figure 10:
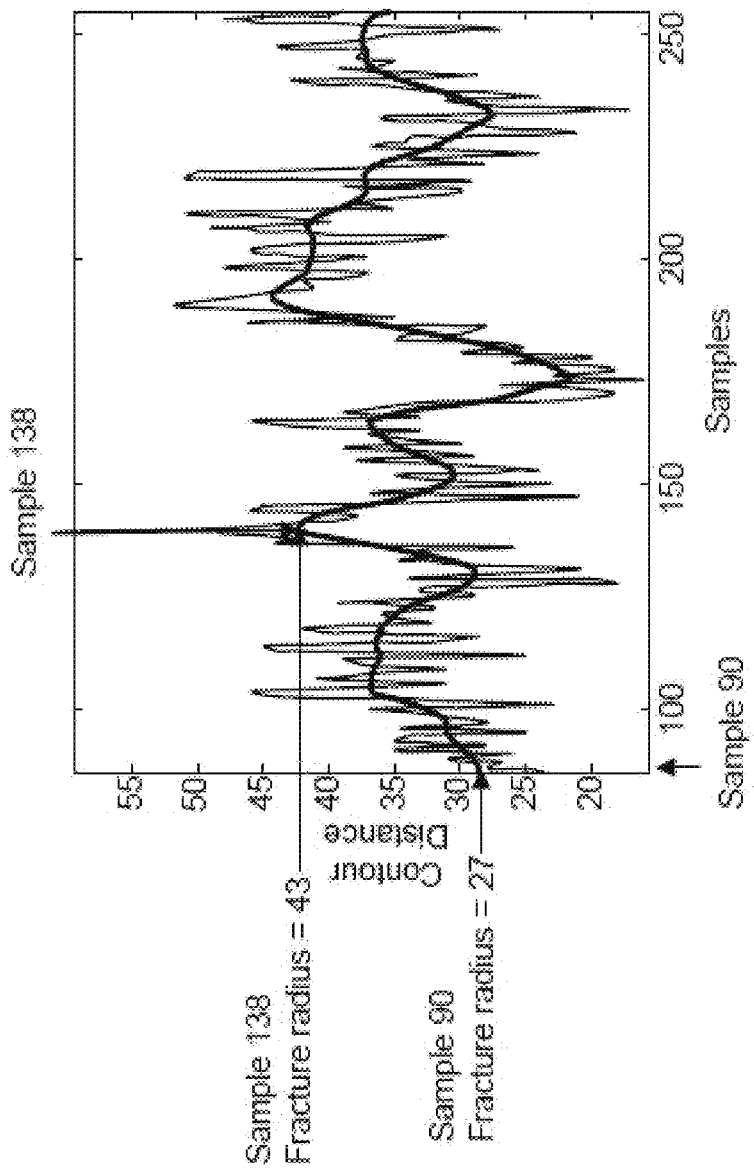
FIG. 10 is a plot illustrating a fracture extension estimate generated for a plurality of reflected acoustic signal measurements.

In some embodiments, and as illustrated in FIG. 10, the Controller can optionally apply a smoothing function to the generated fracture extension estimate. One non-limiting example of a smoothing function that may be applied to the generated fracture extension estimate may include a multi-point triangular moving average filter or any other linear transformation. In some embodiments, the smoothing function may smooth the fracture extension estimates at varying offsets from the location along the wellbore axis to which the fracture extension estimate corresponds. For example, the smoothing function may smooth the fracture extension estimate based on offsets of 1-3', 3-5', or 5-10' before and after the location at which a fracture extension estimate was determined.

FIG. 10 is a plot illustrating a fracture extension estimate generated for a plurality of RAS measurements. As shown in FIG. 10, the Controller may generate a fracture extension estimate for each of a plurality of RAS measurements. The Controller may further generate data and a plot corresponding to the variation in the fracture extension estimate as a function of the distance from the wellbore for a plurality of RAS measurements. In this way, the spatial extent (or contour distance) of a fracture or fracture network can be characterized in relation to the wellbore location. In some embodiments, the Controller may perform a shape approximation by applying a smoothing function to the plurality of fracture extension estimates associated with the plurality of RAS measurement samples. The plurality of samples associated with the X axis may correspond to the fracture extension estimates associated with a plurality of RAS measurements that were sequentially obtained as the Sensor traversed a horizontal wellbore axis as depicted in FIG. 1B. The contour distance associated with the Y axis may correspond to the fracture extension estimate determined for each of the plurality of RAS measurements. For example, for the sample RAS measurement obtained at a particular location along the wellbore axis (e.g., sample 90), the Controller may determine the fracture extension estimate to be 27 feet from the wellbore location. That is, the portion of the fracture or fracture network characterized in the sample 90 RAS measurement is determined to occur 27 feet from the wellbore location. Similarly, the Controller may determine that the fracture extension estimate obtained for sample 138 is 43. In this way, the Controller may process the plurality of fracture extension estimates corresponding to the respective RAS measurement samples and develop a contour depicting the boundary or spatial extent of a fracture or fracture networks in regard to the wellbore location.

In some embodiments, the Controller can output the unsmoothed fracture extension estimate or the smooth fracture radius estimate generated as described above. The Controller may output the generated fracture extension estimate to a Display coupled to the Controller for visualization of the fracture extension estimate. In some embodiments, the Controller may output the fracture extension estimate to a database, memory, or storage device coupled to the Controller. Additionally, or alternatively, the Controller may be configured to output the fracture extension estimate to a modeling environment or development environment for further analysis and processing. In some embodiments, the Controller may output the fracture extension estimate for the plurality of RAS as one or more data sets for importation in to a reservoir modeling workflow or a discrete fracture network modeling workflow.

Figure 11:
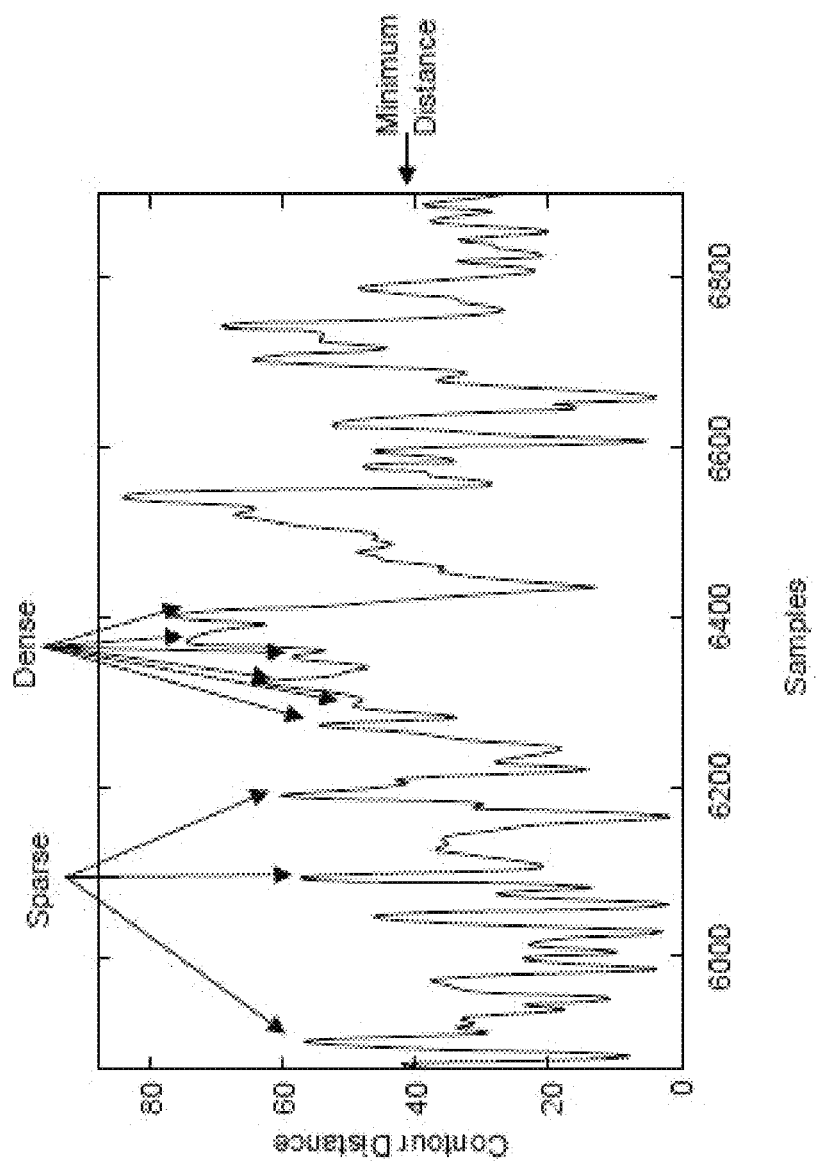
FIG. 11 is a plot illustrating a fracture extension estimate generated for a plurality of reflected acoustic signal measurements with a minimum threshold applied.

Returning to FIG. 2, in operation 230, and as illustrated in FIG. 11, the method 200 includes generating a three-dimensional fracture network model corresponding to the fracture radius estimates generated for each of the plurality of reflected acoustic signal measurements. The three-dimensional fracture network model can be associated with an extent of fracture extending from the wellbore at the plurality of locations oriented along the wellbore axis. The three-dimensional fracture network model is formed by combining each of the plurality of RAS measurements that are acquired in at least two different directions approximately perpendicular to the axis of the wellbore, at a plurality of locations along the wellbore axis. The Controller may determine the RAS measurements received by the Sensor from two different directions which are approximately perpendicular to the wellbore axis at a given location along the wellbore axis. The Controller may then combine the previously generated fracture extension estimates for those RAS measurements to form a two-dimensional representation of the fracture extension estimate at a given location along the wellbore axis. In some embodiments, the Controller may combine the generated fracture extension estimates together azimuthally. In other embodiments, the Controller may combine the generated fracture extension estimates by geometric vectors (e.g., by North, South, East, or West vector relative to the wellbore axis). By iteratively, repeating this sequence and combining the two-dimensional representations of each fracture extension estimate generated for the plurality of wellbore locations, the Controller may form a three-dimensional fracture network model associated with the extent of fracture. The extent of fracture is thus represented as a shape approximation of the extent of fracture that extends from the wellbore at multiple locations along wellbore axis.

FIG. 11 is a plot illustrating a fracture extension estimate generated for a plurality of reflected acoustic signal measurements with a minimum threshold applied according to the methods described herein. Based on generating the fracture extension estimate for each of the plurality of RAS measurements, the Controller may output the generated fracture extension estimates as described in relation to operation 220 of FIG. 2. The Controller may further output a three-dimensional fracture network model based on combining fracture extension estimates for each of the plurality of RAS measurements acquired in at least two different directions approximately perpendicular to the axis of the wellbore at a plurality locations oriented along the wellbore axis. The three-dimensional fracture network model describes a length of fracture extending away from the wellbore at the plurality of locations oriented along the wellbore axis. For example, as shown in FIG. 11, the wellbore axis can be seem oriented from the top of the plot and extending down the right corner of the plot. The generated fracture extension estimates are plotted as extending away from the wellbore axis depicting the spatial extent of the fracture or fracture network. The length of each fracture extension estimate, as well as the density of the shading associated with each of the fracture extension estimates correspond to the intensity of the RAS measurements obtained by the Sensor and processed by the Controller. In some embodiments, each fracture extension estimate may be represented as a color corresponding to the strength or intensity of the RAS measurement as measured at a given location along the wellbore axis. As shown in FIG. 11, the fracture extension estimates in four (4) directions, e.g., x, −x, y, and −y, have been combined. The combined fracture radius estimates form a three-dimensional fracture network model corresponding to the spatial extent and characteristics of one or more fractures or fracture networks in a target region.

Figure 12:
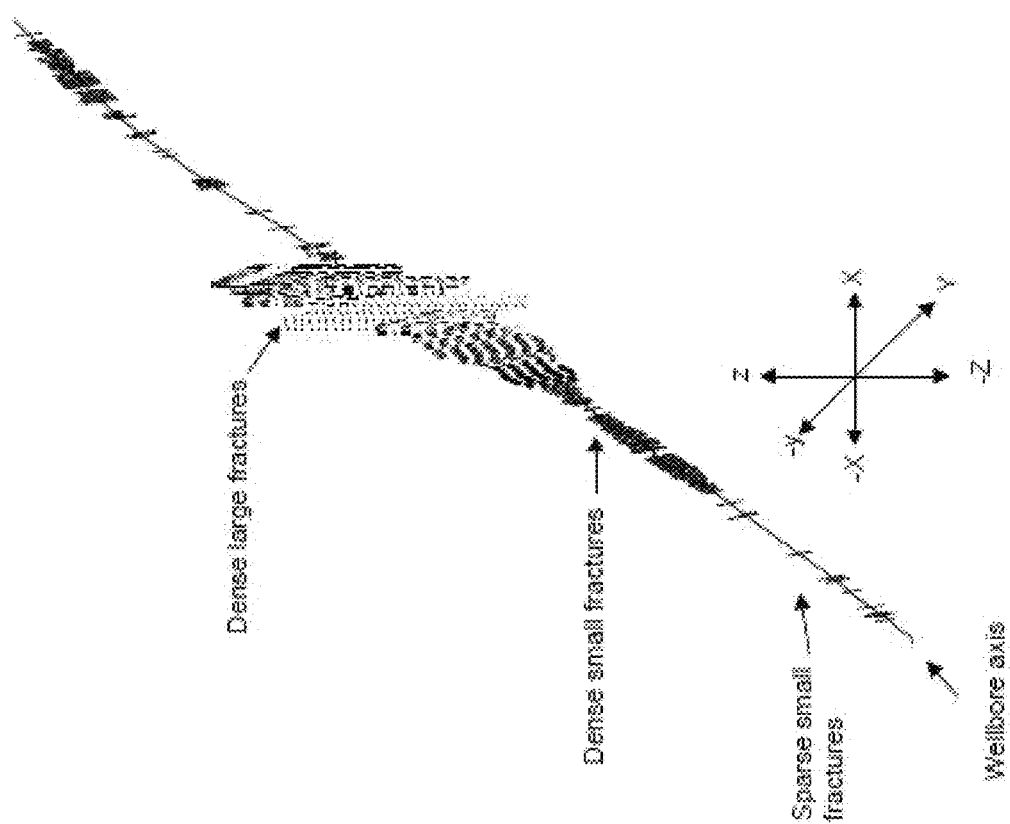
FIG. 12 is a plot illustrating a distribution and size of natural fractures in a three-dimensional fracture network model generated according to the methods described herein.

In operation 240, as shown in dashed lines, and as illustrated in FIGS. 11-12, the Controller can optionally discretize the fracture network model and select planes based on the intensity within the fracture radius and the extension of the fracture radius. Based on the intensity found within the fracture extension estimate and the radius value of the fracture extension estimate, discrete planes maybe selected. The three-dimensional fracture network model may be generated based on the Controller combining the generated fracture extension estimates for each of the plurality of RAS acquired in at least two different directions that are approximately perpendicular to the axis of the wellbore location at a plurality of locations oriented along the wellbore axis. In some embodiments, the direction of strike and dip of the features maybe determined by utilizing a combination of planes and may or may not intersect the wellbore. In other embodiments as well as the distribution of the reflected intensity within the contour selected. Discretizing the fracture network model allows for clear identification of features and their non-uniformity along the wellbore. Selection of a minimum threshold and selection of the maximum in intensity or distance, as FIG. 11 shows, allows for determining the distribution and size of the natural fractures to be imaged in FIG. 12. In some embodiments, the Controller may output the discrete three-dimensional fracture network model to a database, memory, or storage device.

In operation 250 and as illustrated in FIG. 13, the Controller outputs the three-dimensional fracture network model. For example, as described in operation 230 and optionally in operation 240 above, a three-dimensional fracture network model may be generated as shown in FIG. 12. The three-dimensional fracture network model may be generated based on the Controller combining the generated fracture extension estimates for each of the plurality of RAS acquired in at least two different directions that are approximately perpendicular to the axis of the wellbore location at a plurality of locations oriented along the wellbore axis. In some embodiments, the Controller may output the three-dimensional network radius model to a database, memory, or storage device coupled to the Controller. Additionally, or alternatively, the Controller may be configured to output the three-dimensional fracture network model to a modeling environment or development environment for further analysis and processing. In some embodiments, the Controller may output the three-dimensional fracture network model for importation in to a reservoir modeling workflow or a discrete fracture network modeling workflow. The three-dimensional fracture network model may be output to a Display coupled to the Controller. The three-dimensional fracture network model presents the spatial extent and direction of the fractures or fracture network in a way that is more intuitive to interpret. In this manner, a more comprehensive visualization of the generated fracture extension estimates can be provided as compared to conventional fracture imaging techniques.

Exemplary technical effects of the methods, systems, and devices described herein include, by way of non-limiting example improved methods of generating a three-dimensional fracture radius model. Using the methods described herein, a more accurate and readily interpretable model can be generated. The three-dimensional fracture radius model generated as described herein provides a more precise representation of earth formations, including but not limited to the location, orientation, spatial extent and characteristics of fractures or fracture networks in target regions being operated for hydrocarbon energy production. Additionally, the three-dimensional fracture radius model generated as described herein can be generated without complex computational processing or resources and can be more readily imported for use in other modeling workflows or tool environments, such as reservoir modeling workflows or tools and discrete fracture network modeling workflows or tools.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method, comprising:
receiving, by at least one processor, a plurality of reflected acoustic signal measurements acquired in response to emission of acoustic waves by one or more sensors disposed in a wellbore within a target region, wherein the plurality of reflected acoustic signal measurements represent a strength of reflected acoustic waves as a function of time measured in at least one predetermined direction oriented with respect to an axis of the wellbore;
generating a fracture intensity threshold for each of the plurality of reflected acoustic signal measurements;
generating, based on the generated fracture intensity threshold, a fracture extension estimate for each of the plurality of reflected acoustic signal measurements, wherein the fracture extension estimate represents a length of fracture within an area extending from the wellbore within the target region in at least one predetermined direction;
generating, by the at least one processor, a three-dimensional fracture network model corresponding to the generated fracture extension estimates; and
displaying, by the at least one processor, the three-dimensional fracture network model in three dimensions with respect to the axis of the wellbore.

2. The method of claim 1, wherein the three-dimensional fracture network model is generated by combining the generated fracture extension estimates.

3. The method of claim 2, wherein the fracture extension estimates are combined based on reflected acoustic signal measurements acquired in at least two different directions approximately perpendicular to the axis and/or along the axis of the wellbore at a plurality locations oriented along the wellbore axis.

4. The method of claim 3, wherein the three-dimensional fracture network model represents an extent of fracture extending from the wellbore at the plurality of locations oriented along the wellbore axis.

5. The method of the claim 1, wherein the generated three-dimensional fracture network model is used to update a reservoir model in a modeling and simulation environment.

6. The method of claim 1, wherein the generated three-dimensional fracture network model is used to design a reservoir model in a modeling and simulation environment.

7. The method of claim 1, wherein the generated three-dimensional fracture network model is used to forecast results associated with stimulation of a reservoir being modeled in a modeling and simulation environment.

8. The method of claim 1, wherein the generated three-dimensional fracture network model is used to analyze one or more efficiency measurements associated with stimulation of a reservoir model in a modeling and simulation environment.

9. The method of claim 1, wherein the one or more sensors include deep wave imagining sensors.

10. The method of claim 1, wherein the fracture intensity threshold is determined based on one or more of a wavelength of the acoustic wave emitted by the one or more sensors, and/or a resolution of the reflected acoustic waves received by the one or more sensors.

11. A system, comprising:
at least one data processor;
memory, storing instructions which, when executed by the at least one data processor, causes the at least one processor to perform operations comprising:
receiving a plurality of reflected acoustic signal measurements acquired in response to emission of acoustic waves by one or more sensors disposed in a wellbore within a target region, wherein the plurality of reflected acoustic signal measurements represent a strength of reflected acoustic waves as a function of time measured in at least one predetermined direction oriented with respect to an axis of the wellbore;
generating a fracture intensity threshold for each of the plurality of reflected acoustic signal measurements;
generating, based on the generated fracture intensity threshold, a fracture extension estimate for each of the plurality of reflected acoustic signal measurements, wherein the fracture extension estimate represents a length of fracture within an area extending from the wellbore within the target region in at least one predetermined direction;
generating a three-dimensional fracture network model corresponding to the generated fracture extension estimates; and displaying the three-dimensional fracture network model in three dimensions with respect to the axis of the wellbore.

12. The system of claim 11, wherein the three-dimensional fracture network model is generated by combining the generated fracture extension estimates.

13. The system of claim 12, wherein the fracture extension estimates are combined based on reflected acoustic signal measurements acquired in at least two different directions approximately perpendicular to the axis and/or along the axis of the wellbore at a plurality locations oriented along the wellbore axis.

14. The system of claim 13, wherein the three-dimensional fracture network model represents an extent of fracture extending from the wellbore at the plurality of locations oriented along the wellbore axis.

15. The system of claim 11, wherein the generated three-dimensional fracture network model is used to update a reservoir model in a modeling and simulation environment.

16. The system of claim 11, wherein the generated three-dimensional fracture network model is used to design a reservoir model in a modeling and simulation environment.

17. The system of claim 11, wherein the generated three-dimensional fracture network model is used to forecast results associated with stimulation of a reservoir being modeled in a modeling and simulation environment.

18. The system of claim 11, wherein the generated three-dimensional fracture network model is used to analyze one or more efficiency measurements associated with stimulation of a reservoir model in a modeling and simulation environment.

19. The system of claim 11, wherein the one or more sensors include deep wave imagining sensors.

20. A non-transitory computer program product storing instructions, which when executed by at least one data processor of at least one computing system, implement operations comprising:
receiving a plurality of reflected acoustic signal measurements acquired in response to emission of acoustic waves by one or more sensors disposed in a wellbore within a target region, wherein the plurality of reflected acoustic signal measurements represent a strength of reflected acoustic waves as a function of time measured in at least one predetermined direction oriented with respect to an axis of the wellbore;
generating a fracture intensity threshold for each of the plurality of reflected acoustic signal measurements;
generating, based on the generated fracture intensity threshold, the fracture extension estimate for each of the plurality of reflected acoustic signal measurements, wherein the fracture extension estimate represents a length of fracture within an area extending from the wellbore within the target region in at least one predetermined direction;
generating a three-dimensional fracture network model corresponding to the generated fracture extension estimates; and
displaying the three-dimensional fracture network model in three dimensions with respect to the axis of the wellbore.

* * * * *